Jan. 18, 1927. 1,615,122
D. E. GORDON
WAFFLE IRON
Filed May 29, 1925
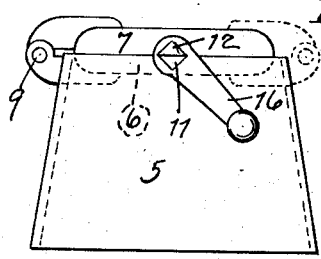
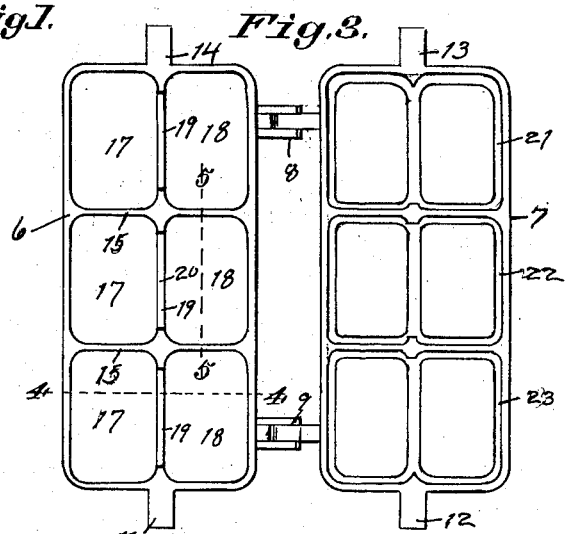
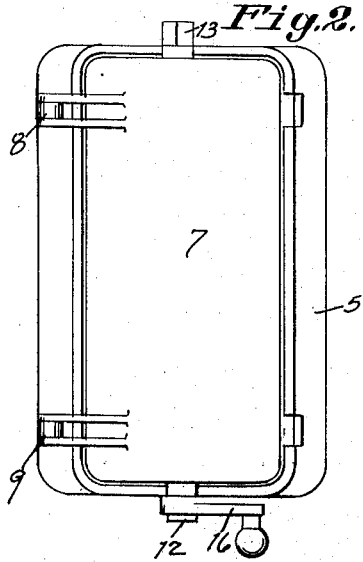
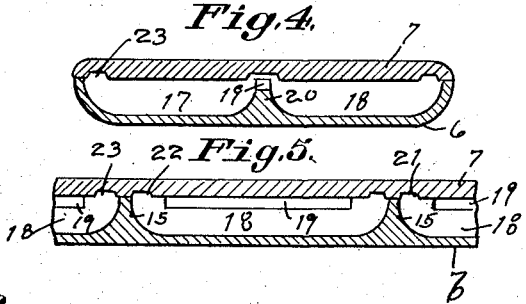
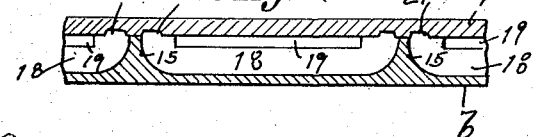
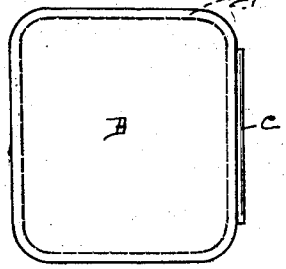
Inventor.
Doc. E. Gordon
Victor J. Evans
By Attorney Patented Jan. 18, 1927.

1,615,122

UNITED STATES PATENT OFFICE.

DOC E. GORDON, OF BERKELEY, CALIFORNIA.

WAFFLE IRON.

Application filed May 29, 1925. Serial No. 33,748.

This invention relates to improvements in waffle irons and has particular reference to a waffle iron which will produce a waffle which may be folded upon itself.

Another object of this invention is to produce a waffle iron which is simple in construction, and therefore, cheap to manufacture.

An additional object is to produce an iron which will cook a waffle having a novel structure and one which will be more appealing to the purchasing public.

Other objects and advantages will be apparent during the course of the following description.

In the accompanying drawings forming a part of this specification, and in which like numerals are employed to designate like parts throughout the same, Figure 1 is an end elevation of Figure 2, Figure 2 is a top plan view of my waffle iron, Figure 3 is a plan view of the cooking element in open position, Figure 4 is a cross section taken on the line 4—4 of Figure 3, Figure 5 is a cross section taken on the line 5—5 of Figure 3, Figure 6 is an enlarged detail cross section of a waffle as the same would appear when produced in my iron, Figure 7 is a cross section of the waffle iron shown in Figure 6 folded upon itself, and Figure 8 is a top plan view of the waffle.

At the present time it is common to employ a heated iron within which a batter is poured and to turn this iron so that both surfaces will be exposed to the heat from time to time so as to cook the entire quantity of batter thereby producing a light and palatable waffle. It requires considerable cooking to produce a waffle of this character. I have, therefore, produced a new type of iron wherein a much thinner waffle is cooked and then folded upon itself. This permits the butter or syrup to be placed between the layers of the waffle in counter-distinction to being placed on the top of the waffle, as is now customary. It is also obvious that other fillings besides butter and syrup may be inserted, in order to increase the palatableness of the waffle.

In the accompanying drawings wherein for the purpose of illustration is shown a preferred embodiment of my invention, the numeral 5 designates a base member having an open bottom and top. This base member is preferably placed over a suitable burner so that the heat from the burner will be confined in the base member.

Positioned on top of this base member is a cooking element which consists of two sections designated by the numerals 6 and 7, which are hinged together as shown at 8 and 9. The portion 7 will hereinafter be called the top portion and the portion 6 will hereafter be termed the bottom portion.

Formed integral with the top and bottom sections are lugs as shown at 11, 12, 13 and 14. These lugs form trunnions so that the cooking elements may be turned as will be hereinafter noted. The ends of these lugs are triangularly shaped so that when they are lying in contact, they will form a square end upon which a turning-handle 16 may be readily placed. This turning-handle serves two functions, that is, it permits the turning of the cooking elements so that the opposite sides may be presented to the heat, and it also serves to lock the top and bottom sections together.

Referring now to Figure 3, it will be noted that the bottom section 6 is provided with cross ribs 15 and with a medial rib 20. This forms a series of depressions 17 and a series of depressions 18. It will also be noted that a portion of the rib 20 is cut away as shown at 19 so as to form a shallow connecting channel between the depressions 17 and 18. The top section 7 has formed therein channels 21, 22 and 23, the purpose of which is to cause an upstanding rib to be formed around the edge of the waffle.

Assuming that a waffle iron has been constructed in accordance with my invention and that batter is placed in the bottom section 6 so as to fill the depressions 17 and 18 in the three groups herein shown, that the top section has been cooked and turned over upon the bottom section, the handle will then be placed upon the squared ends of the lugs 11 and 12 as shown in Figure 2.

Heat being applied from beneath the base 5 will cause the waffle to become cooked first upon the bottom. After a predetermined time the handle 16 will be given a half revolution with the result that the top section 7 will be presented to the heat which will cook the opposite side of the waffle.

When it is assumed that the waffle is entirely cooked, the handle 16 will be removed and the two sections of the iron separated. This will leave the cooked waffles in the bottom section. The portion of the waffle in the depressions 17 and 18 will be connected by a fin which will act as a hinge.

By referring to Figure 6, it will be noted that "A" represents the waffle which will be cooked in the depression 17, while the letter "B" represents the portion of the waffle which will be cooked in the depression 18. The letter "C" the portion of the waffle connecting these sections permitted by the cutaway band 19 of the rib 20. Each of these sections will have formed thereabout an upstanding edge "D". When removed from the waffle iron this waffle may be folded upon its hinged section "C" and any desired filling may be placed upon the two sections of the waffle, as for instance butter or syrup.

It will thus be seen that by employing a waffle iron of this character an entirely new product is produced.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, I claim:—

In a waffle iron the combination with a base, of a cooking element consisting of a bottom section, said bottom section having a pair of relatively deep depressions therein, a rib positioned between said depressions, said rib being cut away throughout a portion of its length, a top section hinged to said bottom section, and contacting the margin thereof, said top section having its lower face in the same plane as the extremity of the rib and the extremity of the marginal edge of said bottom section, a channel formed in the lower face of said top section adjacent the periphery thereof and communicating with the depressions in the bottom sections, a central channel formed in the lower face of said top section and overlying said rib and in communication with said peripheral channel.

In testimony whereof I affix my signature.

DOC E. GORDON.